United States Patent
Mears et al.

(10) Patent No.: US 11,713,828 B2
(45) Date of Patent: Aug. 1, 2023

(54) PILOT-OPERATED PRESSURE REGULATOR

(71) Applicant: Dresser, LLC, Houston, TX (US)

(72) Inventors: James Kenneth Mears, Riverton, UT (US); Orie Woodman Van Doran, Saint Johns, FL (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 16/729,584

(22) Filed: Dec. 30, 2019

(65) Prior Publication Data

US 2020/0347956 A1 Nov. 5, 2020

Related U.S. Application Data

(60) Provisional application No. 62/841,239, filed on Apr. 30, 2019.

(51) Int. Cl.
| | |
|---|---|
| *F16K 31/126* | (2006.01) |
| *G05D 16/08* | (2006.01) |
| *F16K 31/165* | (2006.01) |
| *F16K 17/04* | (2006.01) |

(52) U.S. Cl.
CPC ............ *F16K 31/126* (2013.01); *F16K 17/04* (2013.01); *F16K 31/165* (2013.01); *G05D 16/08* (2013.01)

(58) Field of Classification Search
None
See application file for complete search history.

(56) References Cited

U.S. PATENT DOCUMENTS

| | | | |
|---|---|---|---|
| 1,987,032 A | | 1/1935 | Spence |
| 2,637,946 A | * | 5/1953 | Parks .................. G05D 16/163 137/489.5 |
| 3,572,382 A | * | 3/1971 | Luthe .................. F16K 39/022 251/282 |
| 3,669,142 A | | 6/1972 | Gerbic |
| 4,669,493 A | | 6/1987 | Kober et al. |
| 5,056,550 A | | 10/1991 | Mooney |
| 6,354,319 B1 | * | 3/2002 | Mooney .............. G05D 16/163 137/14 |
| 6,371,156 B1 | | 4/2002 | Walton et al. |

(Continued)

FOREIGN PATENT DOCUMENTS

| | | |
|---|---|---|
| JP | 55132479 A | 10/1980 |
| JP | 11212656 A | 8/1999 |

(Continued)

OTHER PUBLICATIONS

GE Oil & Gas, Mooney Flowmax Pressure Reducing Regulator for Natural Gas Pipelines, 2014.

(Continued)

*Primary Examiner* — Daphne M Barry
(74) *Attorney, Agent, or Firm* — Paul Frank + Collins P.C.

(57) ABSTRACT

A pressure regulator is configured for better accuracy and response times at higher inlet pressures. These configurations may integrate two-path control with a pressure-balanced plug. The two-path control may leverage a pair of pilot valves, one with a fixed differential pressure and the other with a variable differential pressure. In one implementation, the device is plumbed so that downstream pressure is sensed at both the actuator and the variable differential pressure pilot valve.

20 Claims, 12 Drawing Sheets

(56) References Cited

U.S. PATENT DOCUMENTS

| | | | | |
|---|---|---|---|---|
| 6,415,815 | B1* | 7/2002 | Blann | F16K 31/1262 |
| | | | | 137/494 |
| 8,550,101 | B2* | 10/2013 | Folk | F16K 31/1262 |
| | | | | 137/14 |
| 9,086,702 | B2 | 7/2015 | Griffin, Jr. et al. | |
| 9,176,505 | B2* | 11/2015 | Cheron | G05D 16/06 |
| 9,328,846 | B2 | 5/2016 | Alikhani | |
| 9,400,060 | B2 | 7/2016 | Garvey et al. | |
| 9,732,876 | B2 | 8/2017 | Johnson | |
| 2014/0090724 | A1 | 4/2014 | Mevius et al. | |
| 2014/0090725 | A1* | 4/2014 | Diaz | F16K 17/10 |
| | | | | 137/489.5 |
| 2015/0034179 | A1 | 2/2015 | Loga et al. | |
| 2016/0356389 | A1* | 12/2016 | Masias | G05D 16/163 |
| 2019/0093781 | A1 | 3/2019 | Cunningham | |
| 2019/0243394 | A1 | 8/2019 | Bartels | |

FOREIGN PATENT DOCUMENTS

| | | |
|---|---|---|
| JP | 2000161529 A | 6/2000 |
| JP | 2012211619 A | 11/2012 |

OTHER PUBLICATIONS

Shaw, Kevin; Fundamental Principles of Pressure Regulators, American School of Gas Measurement Technology (2003).

Valtek, Unbalanced and Pressure-Balanced Trim, 2013.

Emerson Process Management Regulator Technologies, Inc, EZH and EZHSO Series Pressure Reducing Regulators, Bulletin 71.2 D103081X012, Dec. 2017.

* cited by examiner

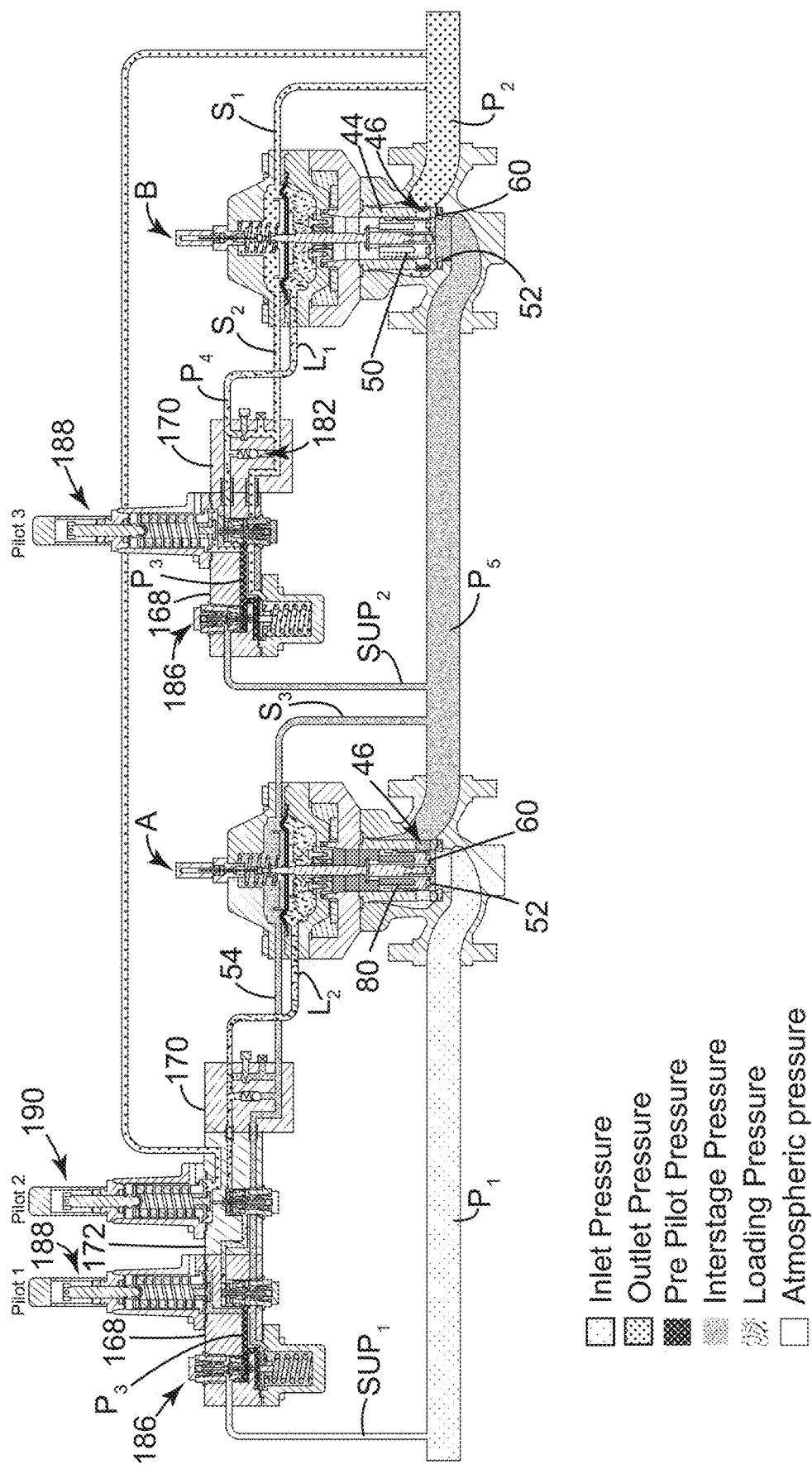

PILOT-OPERATED PRESSURE REGULATOR

CROSS-REFERENCE TO RELATED APPLICATIONS

This application claims the benefit of priority to U.S. Ser. No. 62/841,239, filed on Apr. 30, 2019, and entitled "PILOT-OPERATED PRESSURE REGULATOR." The content of this application is incorporated herein by reference in its entirety.

BACKGROUND

Pressure regulators are useful to control downstream pressure of fluids. Facilities in the natural gas market often employ pressure regulators to manage flow of high-pressure fuel gas through pipelines. However, these applications can pose significant design challenges because operators require devices to have appropriate capacity, accuracy, and response time but also minimize control variations that may result from changes in inlet pressure, rapid changes in downstream demand, or effects of temperature on internal components.

SUMMARY

The subject matter of this disclosure relates to improvements to pressure regulators that address these challenges. Of particular interest are embodiments with a design that integrates two-path control with a balanced trim assembly on a single device. The embodiments may have a spring-operated valve that opens and closes in response to variations in downstream demand. Nominally, the valve has an "equilibrium" position that maintains pressure equally on both upstream and downstream sides of the device. The valve opens from this position to allow fluid to flow through the device to maintain downstream pressure at a relatively constant level (typically in response to increases in downstream demand). The valve moves to reduce flow as demand decreases, often eventually reaching its equilibrium position again. In some applications, the valve may have a fully "closed" position that prevents fluid flow altogether. This proposed design allows for better, more accurate downstream pressure in response to demand. It also increases the operating pressure of the pressure regulator to accommodate applications with an inlet pressure of at least 1500 PSI.

DRAWINGS

Reference is now made briefly to the accompanying drawings, in which.

Figure 6:
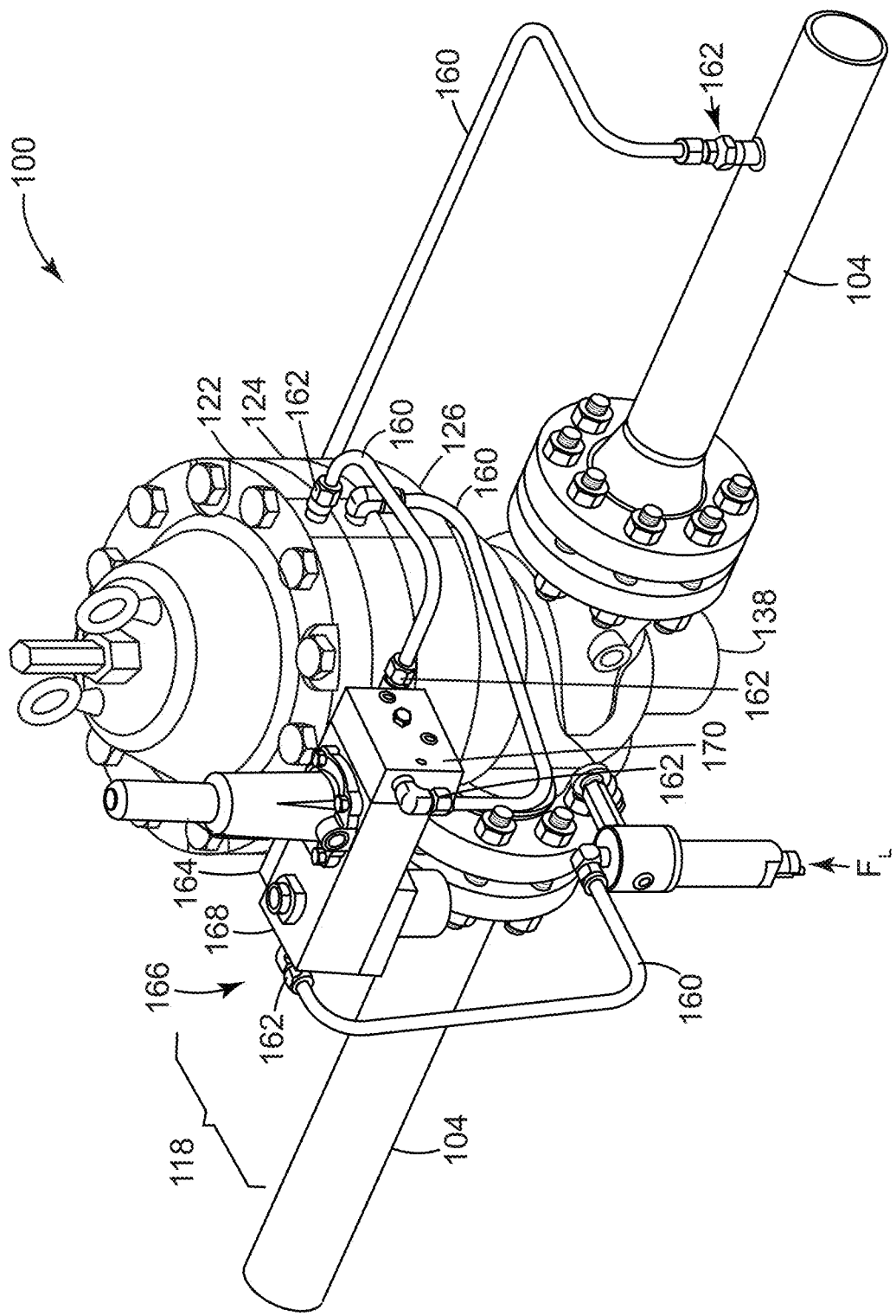
FIG. 6 depicts a perspective view of the pressure regulator of FIG. 2.
Figure 8:
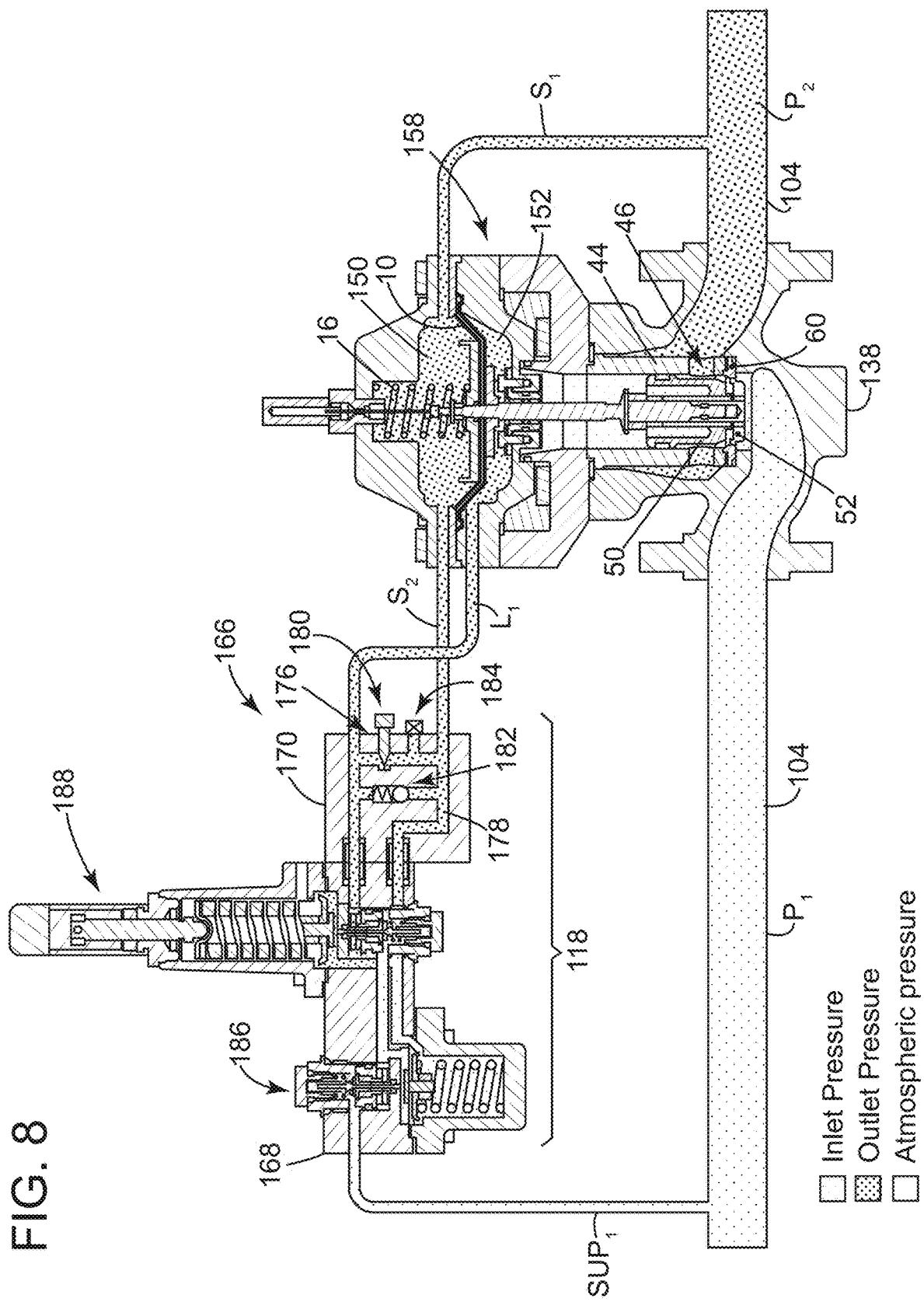
Figure 9:
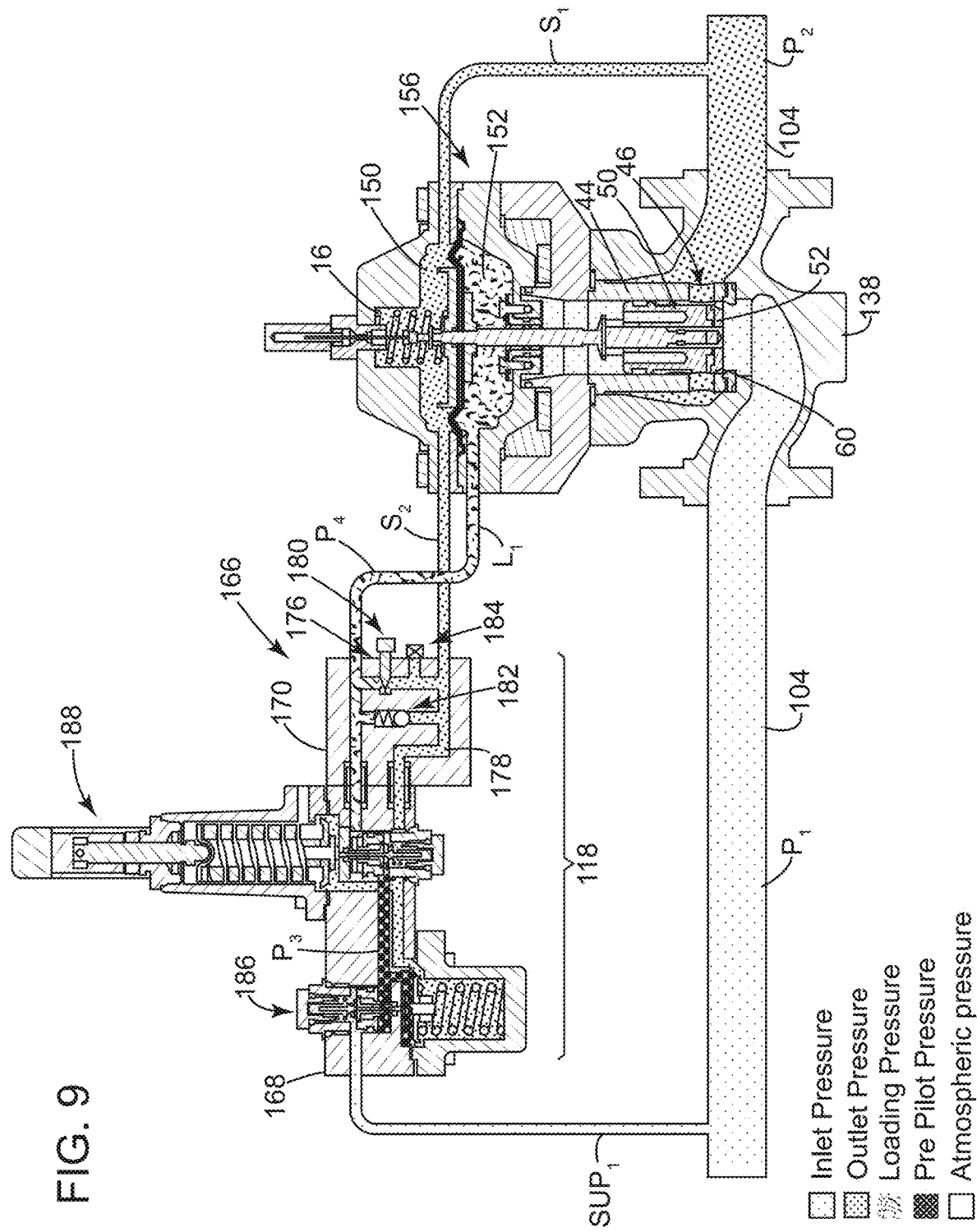
Figure 10:
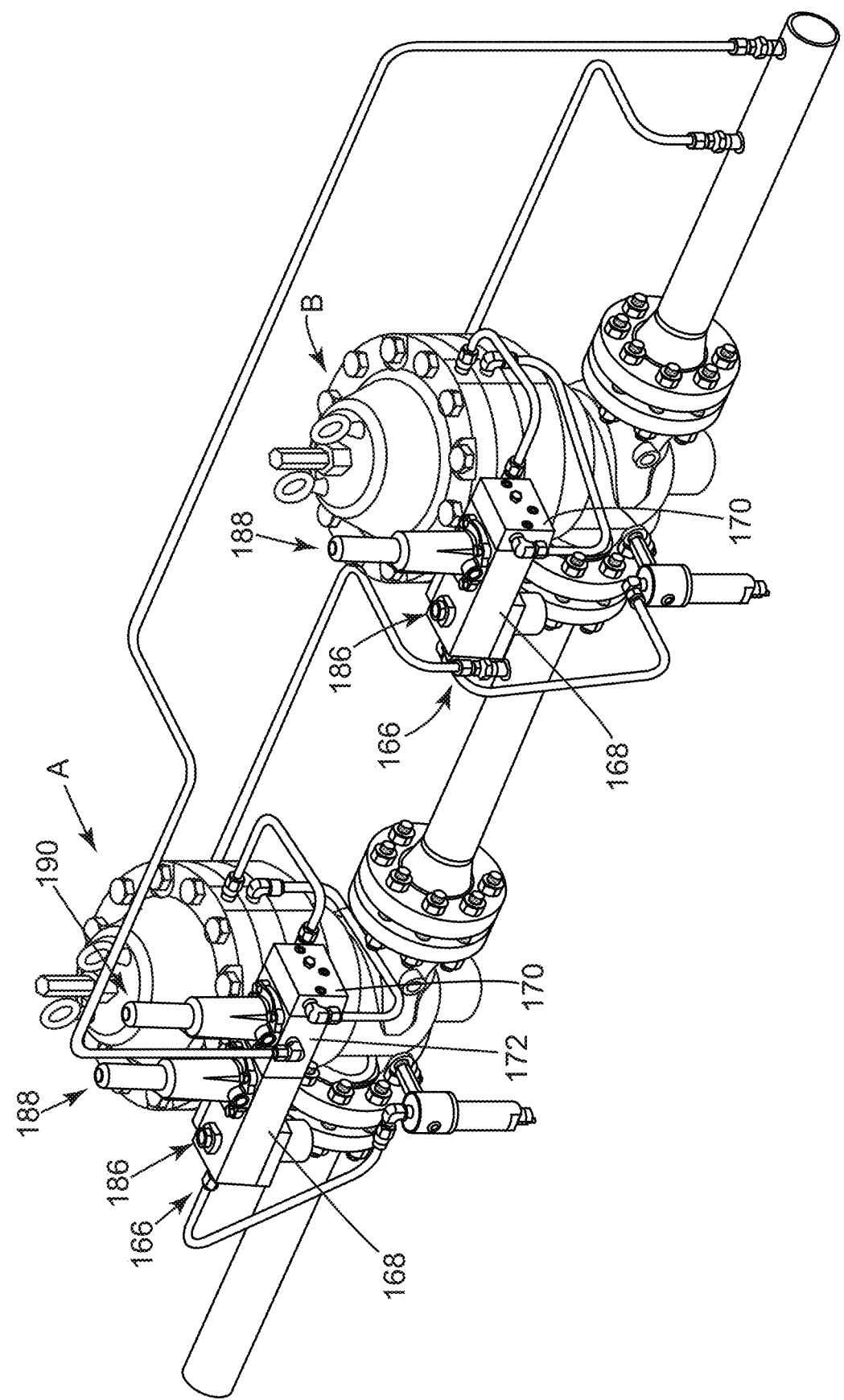
Figure 11:
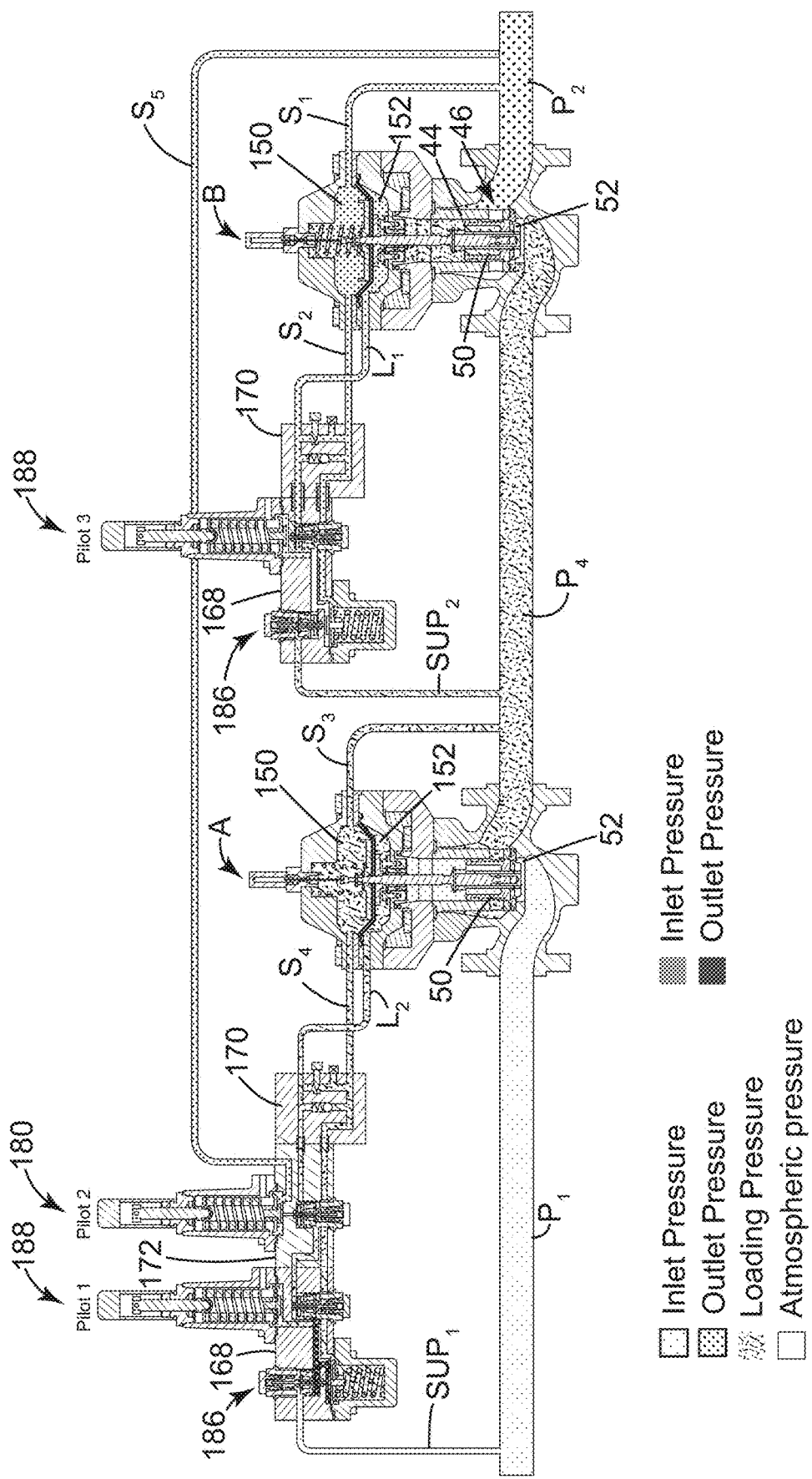

FIG. 8 schematically depicts an elevation view of the cross-section of the pressure regulator of FIG. 6 in a first position;

FIG. 9 schematically depicts an elevation view of the cross-section of the pressure regulator of FIG. 6 in a second position;

FIG. 10 depicts a perspective view of a working monitor system that incorporates pressure regulators of the type depicted herein;

FIG. 11 schematically depicts an elevation view of the cross-section of the system of FIG. 10 with the pressure regulators in a first position; and FIG. 12 schematically depicts an elevation view of the cross-section of the system of FIG. 10 with the pressure regulators in a second position.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

Manufacturers often take opportunities to improve construction of industrial equipment. These opportunities may lead to better, more reliable devices or provide new functions or features on the same. In many cases, the improvements may also lead to innovative solutions that drive savings in the form of lower costs of parts, labor and assembly, or maintenance and repair.

As noted above, pressure regulators play an important role in fluid delivery systems. These devices accurately maintain flowing fluids at specific desired pressures. For many industrial applications, pressure regulators must adopt particularly robust or sturdy designs to withstand high pressures, caustic environments, or simply to provide reliable, long-lasting operation. The designs may require construction (e.g., materials, fastening techniques, etc.) that are particularly costly or time-consuming to make or build to specification.

The discussion below describes various embodiments of a pressure regulator. In contrast to known devices, the pressure regulators herein incorporate a loading system that provides two-path control of a main valve along with a balanced plug in the main valve. This construction allows the device to deploy in applications with high inlet pressures, but with the benefits of highly accurate control and response to changes in downstream demand. As an added benefit, the proposed design arranges some construction as modular parts or sub-assemblies. This modular approach simplifies repair and maintenance. It also allows operators to tailor the device for a particular control scheme. Parts of this modular design are also compatible with other types of flow control devices, like control valves. Other embodiments and configuration are within the scope of the subject matter herein.

Figure 1:
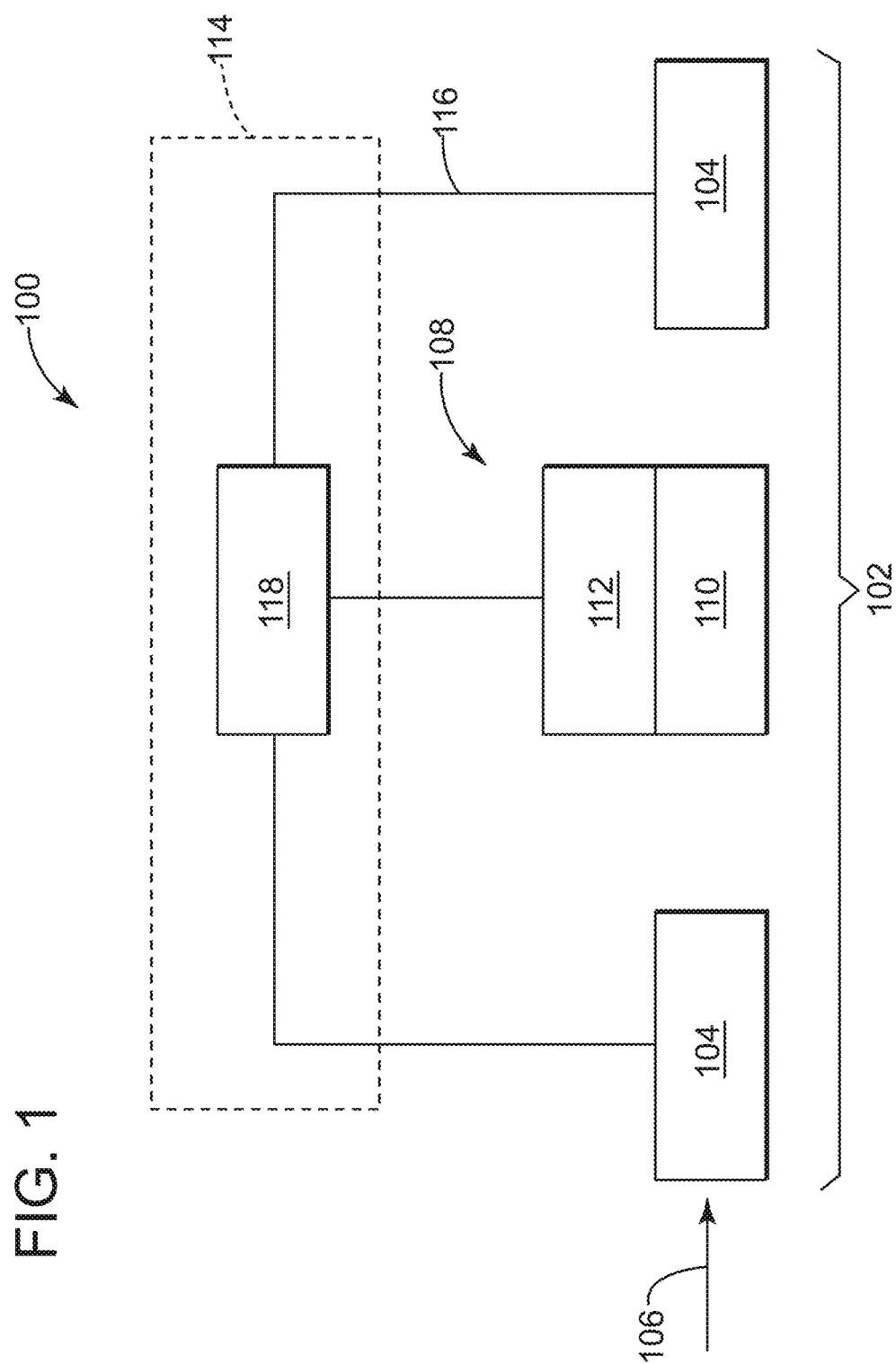
FIG. 1 depicts a schematic diagram of an exemplary embodiment of a pressure regulator.

FIG. 1 depicts a schematic diagram of an exemplary embodiment of a pressure regulator 100. This embodiment is shown as part of a gas distribution system, identified generally by the numeral 102. The system 102 may include pipe 104 that carries material 106. As also shown, the pressure regulator 100 may include a flow control 108 with a balanced trim 110 and an actuator 112. A control system 114 may couple with the actuator 112. The control system 114 may include a fluid circuit 116 with a pilot unit 118 that controls a limited-flow feed of material 106 to the actuator 112.

Broadly, the pressure regulator 100 may be configured for use in applications that have high inlet pressures. These configurations may integrate pilot valves to cause "sense pressure" (or downstream pressure) to register at both the actuator and the pilot valves. This arrangement may prove useful for much better and highly accurate pressure control downstream of the device. In addition, the device incorporates a balanced-pressure plug that provides bubble-tight shut off across a wide range of pressure differentials.

The gas distribution system 102 may be configured for material to transit industrial sites or parts of larger networks. These configurations may find use at facilities that process or distribute hydrocarbons, like natural gas or "fuel gas." Municipalities and utilities may deploy intricate networks to deliver resources to consumers, including residential and commercial fuel gas customers. All of these networks may include myriad devices to regulate flow, including pressure regulator 100. These devices may install in-line with the pipes 104, which may embody high capacity pipelines that can carry fluids at high-pressure. However, in addition to fluids (e.g., liquids and gasses), material 106 may also embody solids and solid/fluid mixes as well.

The flow control 108 may be configured to regulate flow of fuel gas 106 through the pressure regulator 100. These configurations may embody a valve that operates in response to differential pressure across its inlet and outlet. This feature matches flow of fuel gas 106 to demand, e.g., on the network 102. As noted above, the valve may have various operating positions or conditions to manage flow. One position may maintain pressure in equilibrium across the upstream or "supply" side and the downstream or "demand" side of the device. This position may change in response to variations in downstream demand. An increase in downstream demand, for example, may reduce downstream pressure and cause the valve to move to a position that allows more fluid to flow. The resulting flow meets the downstream demand. As pressure equalizes, the valve may move back to its prior "equilibrium" position. In one implementation, the valve may employ a fail-to-close design that causes the valve to default to a "fully-closed" position in response to control pressure loss, mechanical failure, or other problems on the device or in the network 102. This position prevents flow of gas through the device altogether.

The balanced trim 110 may be configured to accommodate higher inlet pressures on the upstream side of the valve. These configurations may include a plug (or closure member) that moves relative to a seat (to instantiate the variable positions of the valve noted above). For "balanced" trim designs, fluid forces balance on either side of the plug at equilibrium. The plug may incorporate openings or like design features for this purpose. The openings may vent fluid from the upstream side of the plug into a chamber in the pressure regulator 100 "above" or on the opposite side of the plug.

The actuator 112 may be configured to regulate the position of the plug relative to the seat. These configurations may embody devices (or mechanical elements) that can apply a load on the plug. Examples of mechanical devices may include a diaphragm that is sensitive to changes in pressure. A spring may find use to provide a spring force that supplements the diaphragm. For fail-to-close devices, the spring force will direct the plug into its fully-closed position.

The control system 114 may be configured to apply gain to the system. These configurations can embody devices that multiply a small change in downstream pressure into a larger change at, e.g., the diaphragm. These devices improve response time and provide stable, accurate control of the position of valve in response to changes in downstream demand.

The fluid circuit 116 may be configured to direct fuel gas 106 among the parts of the control system 114. These configurations may leverage a local network of conduit (or piping or tubing). The conduit may extend from locations or taps found on the pipe 104 on both the upstream and downstream sides of the pressure regulator 100. These taps allow fuel gas 106 into the conduit. The fuel gas 106 transits the local network to the actuator 112 and through control system 114.

The pilot unit 118 may be configured to regulate pressure to the actuator 112. These configurations may embody devices (or "pilot") with a manifold that houses valves (or "pilot valves"). For two-path control, conduit may couple the pilot valves with the actuator 112 so as to effect gain that enhances response of the plug (or movement of the plug relative to the seat in response) to the changes in downstream demand. The manifold may have internal flow pathways that place multiple pilot valves in flow connection with one another to allow fuel gas 106 to flow between them. The pilot valves may employ designs for fixed differential pressure or a variable differential pressure, as desired. This design can allow for any number of pilot valves (and other devices, like check valves or orifices) to incorporate into a single unit on the pressure regulator 100. In one implementation, the manifold has a modular design with various parts that fit or attach together. This arrangement may accommodate combinations of fixed and variable pilot valves to match any proposed application of the pressure regulator 100 or to permit an end user to effectively tune performance of the pressure regulator 100 as desired.

Figure 2:
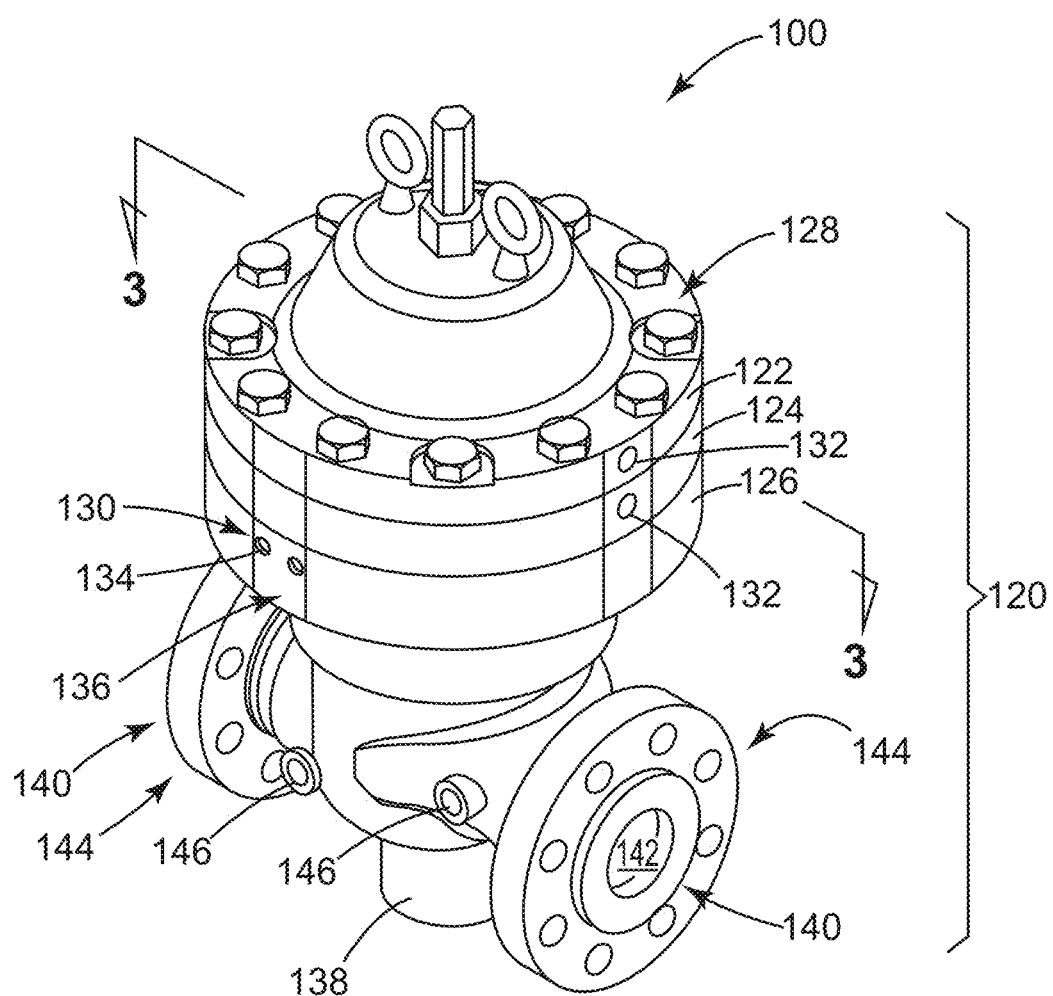
FIG. 2 depicts a perspective view of exemplary structure for the pressure regulator of FIG. 1.

FIG. 2 depicts a perspective view of one example of the pressure regulator 100 of FIG. 1. Parts including parts that instantiate the control system 114 are not shown in this example for clarity. The device may have a housing 120 of robust design, typically made of cast or machined metals to make the device compatible with high pressures and caustic, harsh, or corrosive materials (like fuel gas 106). The housing 120 may have several parts or members, shown here to include a pair of cartridge members (e.g., an upper cartridge member 122 and a lower cartridge member 124) and an adapter member 126. The housing members 122, 124, 126 may mate with one another at a peripheral, outer flange 128. Apertures 130 may populate the outside of one or more of these parts. Some of the apertures 130 may operate as ports 132 with threaded openings to accommodate fluid fittings, as noted more below. Others may operate as threaded holes 134 in a mounting area 136 that receives, for example, parts of the pilot unit 118. In one implementation, the housing 120 may include a valve body 138 that houses the balanced trim 110 discussed above in FIG. 1. The valve body 138 may have openings 140 at either end of an internal passage 142. Flanges 144 (or butt-weld ends) may allow the valve body 138 to mount in-line with sections of pipe 104. In one example, the valve body 138 may include ports 146, which may also have threaded openings to receive fluid fittings as well.

Figure 3:
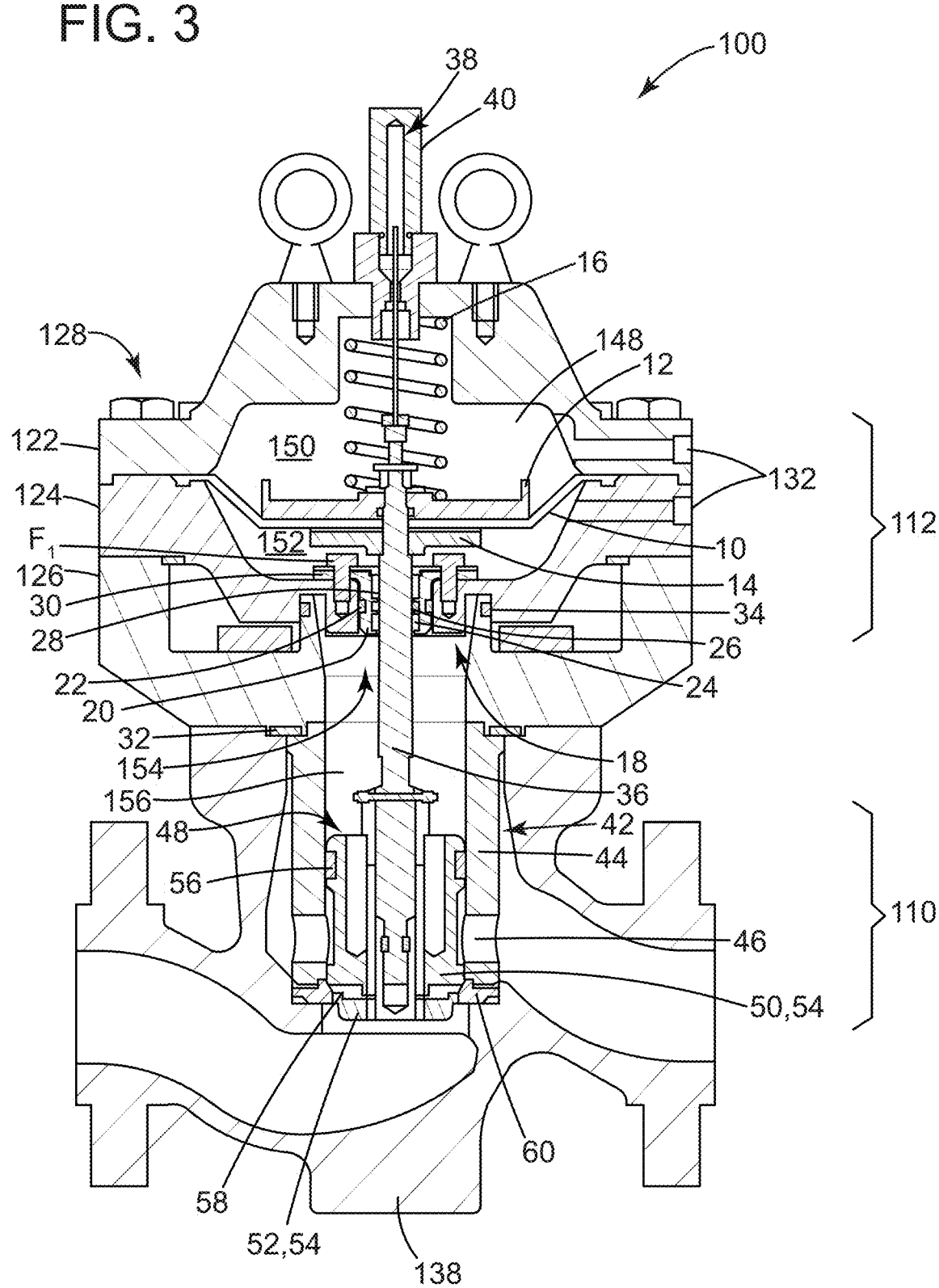
FIG. 3 depicts an elevation view of the cross-section of the pressure regulator of FIG. 2.

FIG. 3 depicts an elevation view of the cross-section of the pressure regulator 100 taken at line 3-3 of FIG. 2. The cartridge members 122, 124 may form an internal chamber 148 that encloses parts of the actuator 112. These parts may include a diaphragm 10, preferably an annular disc of flexible material including metals, rubbers, or composites.

The annular disc 10 may be arranged with its outer, periphery portion "sandwiched" between the peripheral outer flange 128 of the cartridge members 122, 124. This arrangement separates the internal chamber 148 into two chambers (e.g., a first chamber 150 and a second chamber 152). Ports 132 in the housing members 122, 124 may form flow passages that extend to each of the chambers 150, 152. Additional parts of the actuator 112 may include support plates 12, 14 that reside on either side of the annular disc 10. A compression spring 16 may reside in the first or "upper" chamber 150 to apply force to the upper support plate 12. In the second or "lower" chamber 152, a seal pack 18 may insert into an opening 154 in the cartridge member 124. The seal pack 18 may have an annular body 20 with an outer seal 22, like an o-ring that resides in a groove. The annular body 20 may also have a centrally-located through bore to receive inner seals (e.g., a first inner seal 24 and a second inner seal 26) and a bushing 28. A plate 30 may reside on top of the annular body 20. Fasteners $F_1$ may penetrate through the annular body 20 and the plate 30 into the cartridge member 124. Additional seals 32, 34 may find use to seal any interstitial gap between the cartridge member 124 and the adapter 126 and the interface between the adapter 126 and the valve body 138. As also shown, the device may include a valve stem 36 that can move axially through seals 24, 26 and bushing 28. This movement may result from changes in demand downstream of the pressure regulator 100. One end of the valve stem 36 may couple with the diaphragm 10. An indicator 38 may couple with this end, for example, using magnets (although other fastening techniques are readily acceptable as well). The indicator 38 may penetrate through the upper cartridge member 122 into an indicator housing 40 that forms a seal with the same.

The other end of the valve stem 36 may reside in the valve body 138 along with other parts of the balanced trim 110. These parts may reside in a chamber 156. In one implementation, the balanced trim may include a cage 42, shown here as a hollow cylinder 44 with openings 46 disposed circumferentially in its peripheral wall. A plug 48 may reside in the cage 42. As noted herein, the plug 48 may be configured for inlet pressure to balance on either side. These configurations may leverage a bi-furcated design, for example, with a first plug member 50 that has an elongate portion that extends into a second plug member 52. The elongate portion may receive the end of the valve stem 36. Openings 54 in the plug members 50, 52 may allow pressure to balance across the bi-furcated plug 48. An annular seal 56 may reside in a peripheral groove that circumscribes the outside of the second plug member 52. Examples of the annular seal 56 may utilize a rubber ring (with plastic backup ring, if necessary). The rubber ring 56 may contact the inner surface of the peripheral wall on the cylinder 44. This arrangement creates a circumferential seal that circumscribes this inner surface (and the outer surface of the second plug member 52). In one implementation, the plug 48 my incorporate an insert 58, like a Teflon® or nitrile ring that resides between the plug members 50, 52. A portion of the insert 58 may engage with a seat 60 to effect the fully "closed" position of the plug 48.

Figure 4:
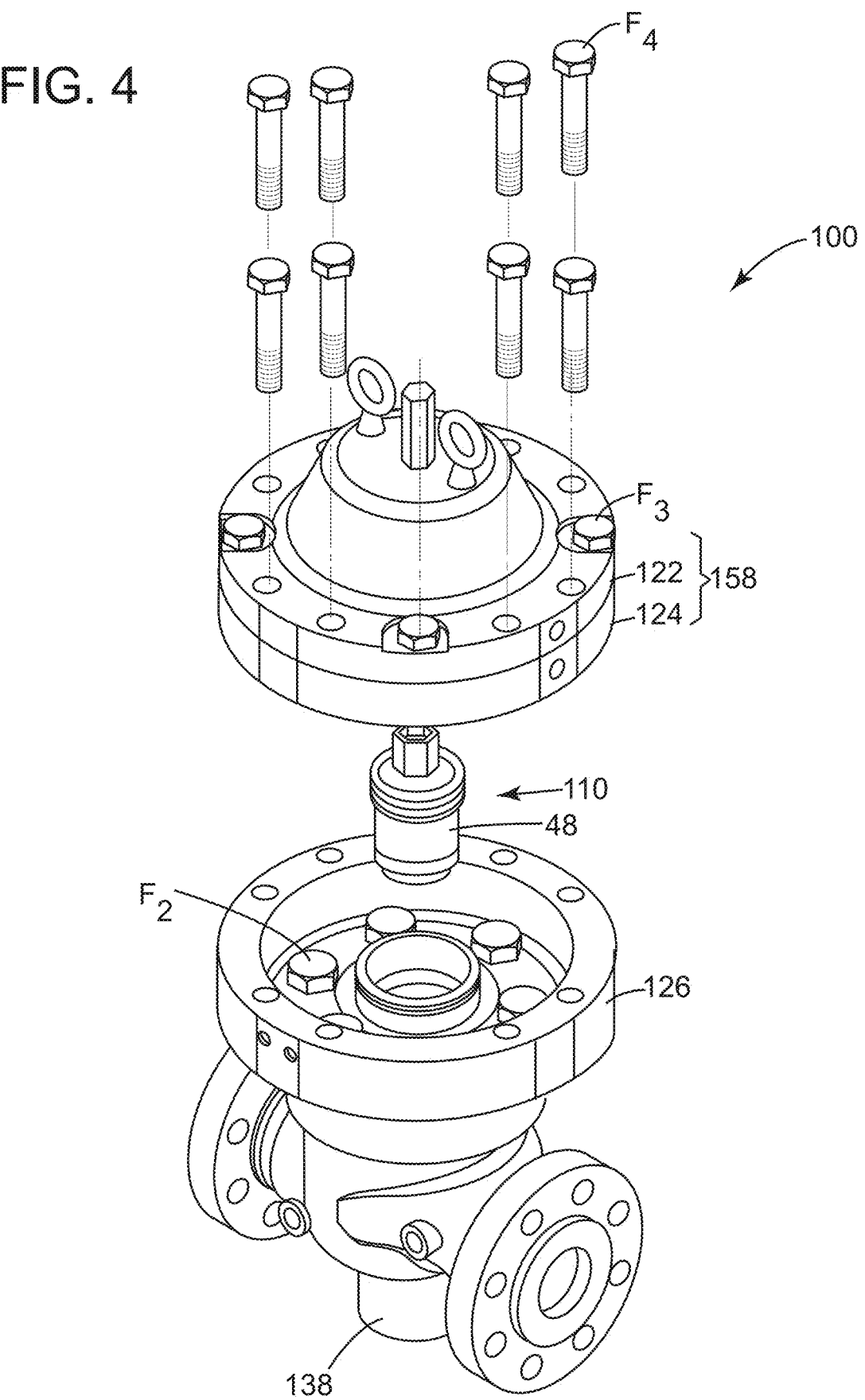
FIG. 4 depicts a perspective view of the pressure regulator of FIG. 2 in partially-exploded form.
Figure 5:
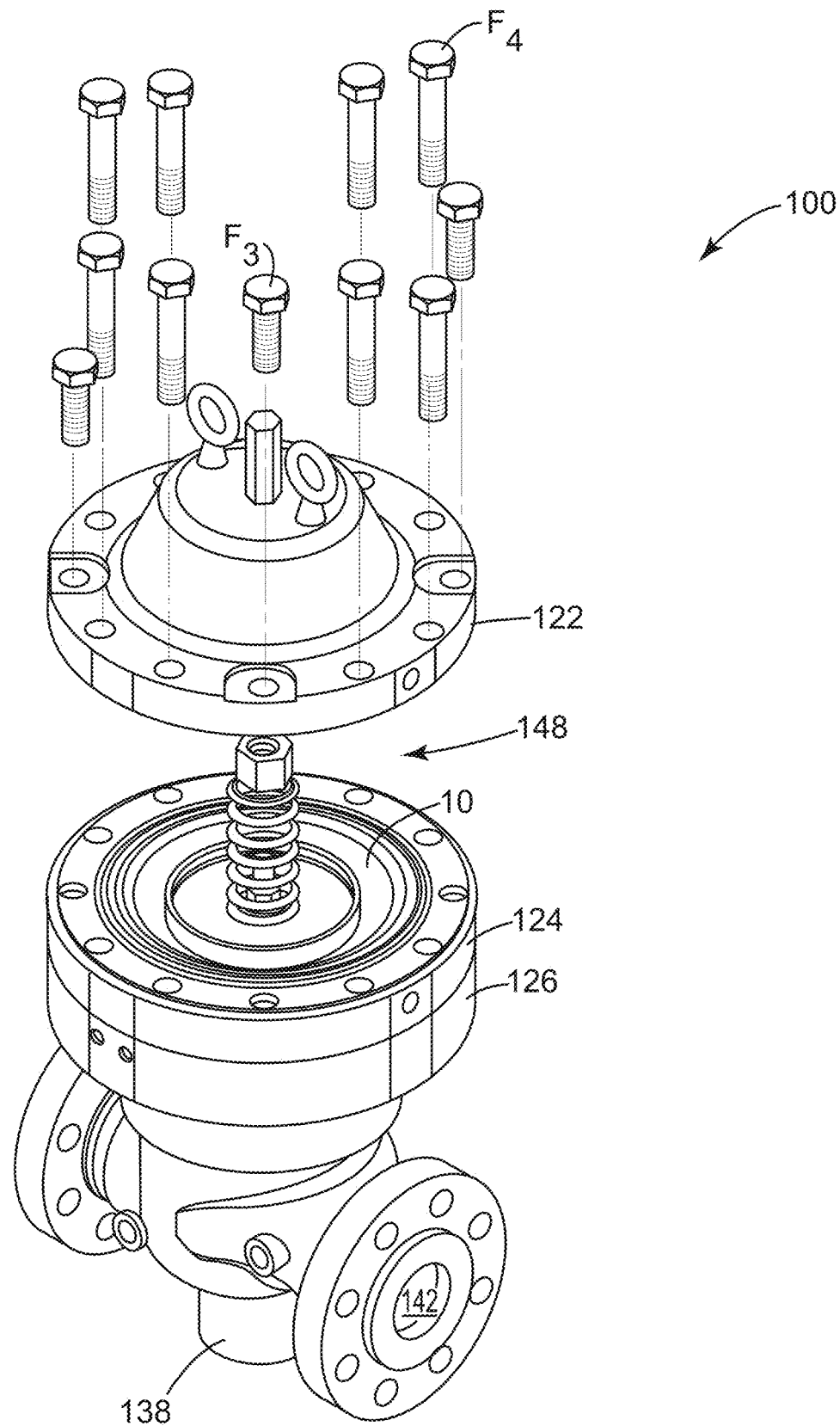
FIG. 5 depicts a perspective view of the pressure regulator of FIG. 2 in partially-exploded form.

FIGS. 4 and 5 show the pressure regulator 100 of FIG. 2 in partially-exploded form. Fasteners $F_2$ may secure the adapter member 126 onto the valve body 138. Fasteners $F_3$ may secure the cartridge members 122, 124 together to create an "actuator cartridge" 158. Fasteners $F_4$ may insert through each of the cartridge members 122, 124 to secure the actuator cartridge 158 to the adapter member 126. Notably, this arrangement creates a modular structure that allows an end user to perform maintenance and repair on the pressure regulator 100 in its installed or "in-line" location on the pipe 104. In FIG. 4, an end user can remove fasteners $F_4$ to decouple the actuator cartridge 158 from the adapter member 126. The end user can lift the actuator cartridge 158 off of the adapter 126. This action also removes parts of the balanced trim 110 (namely, the plug 48 in whole) out of the valve body 138. As best shown in FIG. 5, the end user could remove fasteners $F_3$, $F_4$ to decouple the upper cartridge member 122 from the lower cartridge member 124. The end user can lift the upper cartridge member 122 off of the lower cartridge member 124 to gain access to the internal chamber 148 formed by cartridge members 122, 124. This feature can allow the end user to service the diaphragm 10 without disturbing other parts, including the seals 32, 34 (FIG. 3) or the balanced trim 110 (FIG. 3). In one implementation, the end user could also remove the diaphragm 10 to gain access to (and replace) the seal pack 18 (FIG. 3).

FIG. 6 depict a perspective view of an example of the pressure regulator 100 of FIG. 3. Parts have been added in each to continue the discussion of certain features and functionality for the proposed designs. Conduit 160 in the form of, for example, metal tubing, may extend between fluid fittings 162 to complete fluid connections among the parts of the pressure regulator 100 as well as between these parts and locations on the pipe 104 that are upstream and downstream of the pressure regulator 100. In some implementations, a filter $F_L$ may install into the fluid circuit 114, as well. The pilot unit 118 may include an interface block 164 to secure a manifold 166 to the adapter member 126 (at the mounting area 136). The manifold 166 may embody a pair of ported blocks (e.g., a first ported block 168 and a second ported block 170). As noted above, construction of the manifold 166 may permit changes to the pilot unit 118 to expand functions. For example, the blocks 168, 170 may separate from one another to add parts to the manifold 166 that adapt the pressure regulator 100 for particular applications, for example, as part of a working monitor arrangement, among others.

Figure 7:
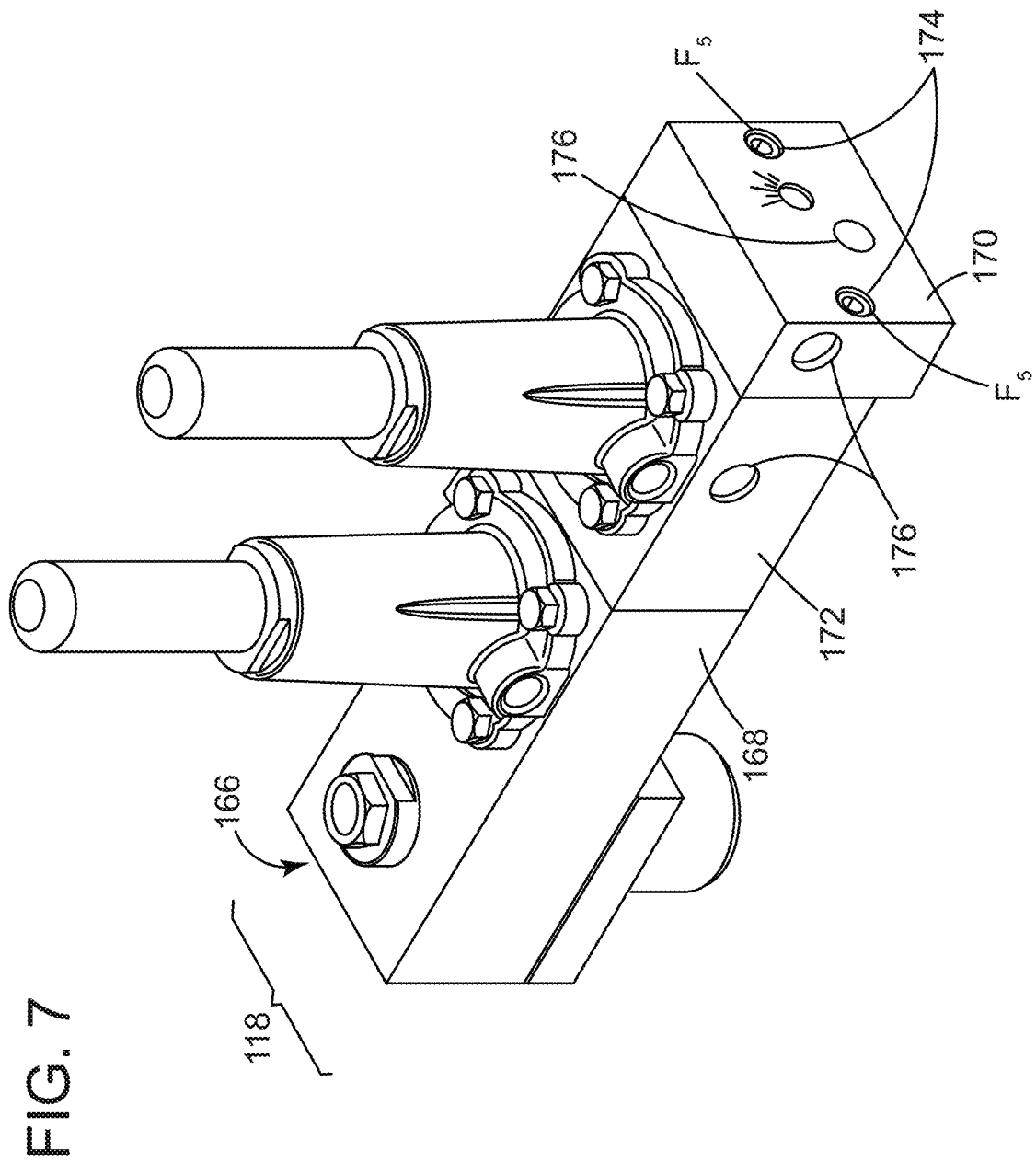
FIG. 7 depicts a perspective view of an example of a manifold of FIG. 2.

FIG. 7 depicts a perspective view of an example of the pilot unit 118 to illustrate this concept. In this example, the manifold 166 incorporates a third ported block 172. Examples of the ported blocks 168, 170, 172 may embody separate elements of the manifold 166, for example, machined billets of metal like aluminum, steel, or steel alloys. The billets may include openings 174, which may embody clearance or threaded holes. The holes 174 may accommodate fasteners $F_5$ to secure the ported blocks 168, 170, 172 together. This arrangement facilitates the modular design for the manifold 166. As also shown, the ported blocks 168, 170, 172 may have outer access ports 176 that provide threaded openings to receive fittings 162 (FIG. 6).

FIG. 8 schematically depicts an elevation view of the cross-section of the pressure regulator 100 taken at line 8-8 of FIG. 6. Conduit 160 may include a supply line $SUP_1$ that couples the manifold 166 with the inlet or supply side $P_1$. Sense lines $S_1$ and $S_2$ may couple the upper chamber 150 of the actuator cartridge 158 with the outlet or demand side $P_2$ and with the manifold 166, respectively. Load line $L_1$ may couple the manifold 166 with the lower chamber 152 of the actuator cartridge 158. As also shown, the ported blocks 168, 170 may have an internal flow network 178, typically machined bores (or like features) that permits fluid flow among various flow controls that allow a technician to more accurately tune the setpoint of the pressure regulator 100. Examples of the flow controls include an adjustable orifice 180 and a check valve 182. The adjustable orifice 180 or "restrictor" may have a v-groove on its outer surface. A threaded plug 184 may find use to seal one or more of the access ports 176. In one implementation, the flow controls may also include a pair of pilot valves (e.g., a first pilot valve 186 and a second pilot valve 188). The first pilot valve 186 may have a fixed differential pressure. The second pilot valve 188 may be configured (with a knob, for example,) to adjust differential pressure across the device. The end user can tune operation of the pilot unit 118 by adjusting the variable pilot device 188 or rotating the adjustable orifice 180 to change radial orientation of the v-groove relative to the internal flow pathway 178 in the second ported block 170. Values for the fixed differential pressure of the first pilot valve 186 may accommodate design parameters of the second pilot valve 188; exemplary values may be in a range of 50 psi to 100 psi.

The restrictor 180 may be configured to work in conjunction with the second or "main" pilot valve 188 to define pressure in the lower chamber 152. In one implementation, the main pilot valve 188 may have an internal orifice that increases and decreases in size in response to changes in downstream pressure. This orifice enlarges in response to downstream pressure below the setpoint of the pressure regulator 188. When the orifice becomes larger the orifice of the restrictor 188, more gas flows into the lower chamber 152 than passes through the restrictor 188 and downstream (through the upper chamber 150). The orifice shrinks in response to downstream pressure above the setpoint so that, when it is smaller than the orifice of the restrictor 100, less gas will flow to the lower chamber 152 (than passes downstream). The end user can adjust the size of the orifice of the restrictor 188 to manage the relationship between this internal orifice and the orifice of the restrictor 188 and, turn, tune accuracy and speed of response of the pressure regulator 100.

The check valve 182 may be configured to limit pressure differential across the diaphragm 10. These configurations may prove useful to prevent damage (to the diaphragm 10) that can result from backpressure or related use cases. Backpressure may occur at startup because, if downstream pressure rises quickly, gas can flow into the upper chamber 150 faster that it bleeds across the restrictor 180. This imbalance builds pressure in the upper chamber 150. The check valve 182 may open in response to downstream pressure above cracking pressure to allow more gas to pass to the lower chamber 152, thus allowing pressure to equalize across the diaphragm 10.

The diagram of FIG. 8 shows the pressure regulator 100 in a first position. This position is consistent with pressure of fuel gas 106 on the supply side $P_1$ in equilibrium (or balanced) with pressure of fuel gas 106 on the demand side $P_2$. The diaphragm 10 (and spring 16) exert a spring force that maintains the position of the balanced plug 50, 52. As noted here, while the plug 50, 52 is shown in contact with the seat 60, this is not always the case. Supply side pressure $P_1$ acts on each side of the balanced plug 50, 52 and concomitantly on one side of the pilot valves 186, 188. Demand side pressure $P_2$ acts on the chambers 150, 152 through the sense line $S_1$ and on opposite sides of the pilot valves 186, 188 through the load line $L_1$ and sense line $S_2$.

FIG. 9 also schematically depicts an elevation view of the cross-section of the pressure regulator 100 taken at line 8-8 of FIG. 6. This diagram show the pressure regulator 100 in a second position. This position reflects a change in demand side pressure $P_2$. The change often corresponds with increased demand, which may rapidly reduce lower side pressure $P_2$ below supply side pressure $P_1$. In response to the sensed pressure differential ($DP_{1,2}$), the first pilot valve 186 operates to reduce or "steps down" supply side pressure $P_1$ at the second pilot valve 188 to a lower, intermediate pressure $P_3$. The second pilot valve 188 opens in response to intermediate pressure $P_3$ to increase or "step up" pressure in the lower chamber 152 to a loading pressure $P_4$, which is high enough to overcome the spring force and move the balanced plug 50, 52 from its first position (in FIG. 8). The new position for the balanced plug 50, 52 permits fuel gas 106 through openings 46 in the cage 44 to meet the downstream demand. In one implementation, the balanced plug 50, 52 may return to the first position as pressure equalizes between the supply side pressure $P_1$ and the demand side pressure $P_2$.

FIG. 10 depicts a perspective view a pair of flow controls of the type discussed with respect to the pressure regulator 100 above. These flow controls form a "working monitor" setup with a first or "first stage" regulator A and a second or "second stage" regulator B in series on the pipeline 104. On the first stage regulator A, the manifold 162 includes ported blocks 164, 166, 168 to accommodate a third pilot valve 190, which preferably is configured to vary differential pressure across the device.

FIG. 11 schematically depicts an elevation view of the cross-section of pressure regulators A, B taken at line 11-11 of FIG. 10. The diagram identifies the pilot valves as Pilot 1 and Pilot 2 on the first stage regulator A and as Pilot 3 on the second stage regulator B. Conduit 174 may include a supply line $SUP_2$ that couples the manifold 162 on the second stage regulator B to an intermediary section of pipeline 104 that extends between pressure regulators A, B. Sense lines $S_3$ and $S_4$ may couple the upper chamber 150 on the first stage regulator A with the intermediary section of pipeline 104 as well. Load line $L_2$ may couple the manifold 162 with the lower chamber 152 on the first stage regulator A. As also shown, sense line $S_5$ couples the third ported block 168 with the demand side $P_2$ to monitor second stage regulator B.

The diagram of FIG. 11 shows the pressure regulators A, B in a first position. The diaphragm 10 (and spring 18) exert a spring force that maintains the position of the balanced plug 50, 52 on both pressure regulators A, B, which may or may not cause the plug 50, 52 to contact the seat 60. This position may reflect conditions with pressure of fuel gas 106 on the supply side $P_1$ in equilibrium (or balanced) with pressure of fuel gas 106 on the demand side $P_2$. When fully-closed, however, the upstream and downstream pressure may differ, but there will be no flow through one or both of the devices. Moving from left to right in the diagram, supply side pressure $P_1$ acts on each side of the balanced plug 50, 52 and concomitantly on one side of the fixed pilot 186 and Pilot 1 on the first stage regulator A. The loading pressure $P_4$ acts on the chambers 150, 152 through sense line $S_3$ and on opposite sides of the fixed pilot 186 and Pilot 1 and Pilot 2 through sense line $S_4$ and load line $L_2$. Downstream pressure $P_2$ acts on Pilot 2 through the sense line $S_5$. On the second stage regulator B, the loading pressure $P_4$ acts on both sides of the balanced plug 50, 52, and on one side of the fixed pilot 186 and Pilot 3 through the supply line $SUP_2$. Demand side pressure $P_2$ acts on the chambers 150, 152 though sense line $S_1$ and on opposite sides of the pilot valve 178 and Pilot 3 through the load line $L_1$ and sense line $S_2$.

FIG. 12 also schematically depicts an elevation view of the cross-section of the pressure regulator 100 taken at line 11-11 of FIG. 10. This diagram shows pressure regulators A, B in a second position that reflects a change in demand side pressure $P_2$. Moving again from left to right in the diagram, fixed pilot 186 on the first stage regulator A operates to reduce supply side pressure $P_1$ to the lower, intermediate pressure $P_3$. Pilot 1 and Pilot 2 operate in response to the intermediary pressure $P_3$ to step down pressure in the upper chamber 150 to an interstage pressure $P_5$, which is less than the loading pressure $P_4$, thus causing the plug 50, 52 to move from its first position (in FIG. 11). In response to the sensed pressure differential ($DP_{2,5}$), the fixed pilot valve 186 on the second stage regulator B steps down interstage pressure $P_5$ at Pilot 3 to the lower, intermediate pressure $P_3$. Pilot 3 opens in response to the intermediate pressure $P_3$ to increase or "step up" pressure in the lower chamber 152 to the loading pressure $P_4$, which is high enough to overcome the spring force and move the balanced plug 50, 52 from its first position (in FIG. 11). The new position for the balanced plug 50, 52 permits fuel gas 106 through openings 46 in the cylinder 44 to meet the downstream demand. In one implementation, the balanced plug 50, 52 on the pressure regulators A, B may return to the first position as pressure equalizes between the supply side pressure $P_1$ and the demand side pressure $P_2$.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A pressure regulator, comprising:
   a pressure-balanced plug having openings from a first side to a second side so as to vent fluid from space on the first side to space on the second side;
   a pneumatic actuator coupled with the pressure-balanced plug, the pneumatic actuator including a diaphragm;
   a pilot unit disposed on the pneumatic actuator, the pilot unit comprising a first pilot valve, an orifice, and a check valve; and
   conduit coupling the pilot unit with the pneumatic actuator, the conduit including a first sense line coupling flow between a first side of the check valve on the first pilot valve and a first side of the diaphragm in the actuator, a second sense line coupling flow of fluid between a location downstream of said pressure regulator and the first side of the diaphragm in the actuator, and a load line coupling flow of fluid between a second side of the check valve on the first pilot valve and a second side of the diaphragm in the actuator.

2. The pressure regulator of claim 1, wherein the pressure-balanced plug comprises a first member and a second member that are separable from one another.

3. The pressure regulator of claim 1, wherein the pressure-balanced plug comprises an outer circumferential seal.

4. The pressure regulator of claim 1, further comprising:
   a cage with a peripheral wall forming a hollow cylinder, wherein the pressure-balanced plug is disposed inside of the hollow cylinder and forms a circumferential seal therewith.

5. The pressure regulator of claim 1, wherein the pilot unit comprises:
   a manifold with an internal flow network; and
   a pair of pilot valves disposed on the manifold and in flow connection with one another via the internal flow network.

6. The pressure regulator of claim 1, wherein the pilot unit comprises:
   a fixed differential pressure pilot valve; and
   a variable differential pressure pilot valve.

7. The pressure regulator of claim 1, wherein the pilot unit comprises:
   a second pilot valve and wherein the orifice is a fixed orifice.

8. The pressure regulator of claim 1, wherein the pneumatic actuator comprises a diaphragm creating a pair of separate, airtight chambers, and wherein the conduit couples the pilot unit to each of the separate, airtight chambers.

9. The pressure regulator of claim 1, further comprising:
   a diaphragm disposed in the pneumatic actuator; and
   a valve stem coupled on one end to the diaphragm and on the other end to the pressure-balanced plug.

10. An apparatus, comprising:
    a valve body with flanged ends;
    a trim assembly disposed in the valve body, the trim assembly comprising a cage, a plug disposed in the cage, and a seat disposed at one end of the cage, the plug having openings that extend from a first side to a second side of the plug so as to allow fluid to flow through the plug from space on the first side to space on the second side;
    a valve stem coupled with the plug;
    an actuator coupled with valve stem, the actuator comprising a diaphragm and a spring;
    pilot valves plumbed to the actuator, the pilot valves comprising a first pilot valve and a second pilot valve, one each with a fixed differential pressure and a variable differential pressure;
    an orifice and check valve coupled with the pilot valves; and
    conduit including a first sense line coupling flow between a first side of the check valve on the first pilot valve and a first side of the diaphragm in the actuator, a second sense line coupling flow of fluid between a location downstream of said pressure regulator and the first side of the diaphragm in the actuator, and a load line coupling flow of fluid between a second side of the check valve on the first pilot valve and a second side of the diaphragm in the actuator.

11. The apparatus of claim 10, further comprising:
    a manifold with an internal flow network, wherein the pilot valves reside on the manifold and are in flow connection with one another via the internal flow network.

12. The apparatus of claim 10, further comprising:
a manifold comprising a first ported block and a second ported block coupled with one another, the first ported block and the second ported block forming an internal flow network; and
a fixed orifice device disposed in the second ported block, wherein the pilot valve are disposed on the first ported block and are in flow connection with one another and with the fixed orifice via the internal flow network.

13. The apparatus of claim 10, further comprising:
an actuator housing that is removably coupled to the valve body, the actuator housing comprising a pair of members that mate with each other along a peripheral edge and form an internal chamber, wherein the diaphragm and spring are disposed in the internal chamber.

14. The apparatus of claim 10, wherein the diaphragm creates an upper chamber and a lower chamber in the actuator, and wherein the variable differential pilot valve is plumbed to both the upper chamber and the lower chamber.

15. The apparatus of claim 10, wherein the pilot valves are plumbed to one another in series with the variable differential pilot valve immediately upstream of the actuator.

16. The apparatus of claim 10, wherein the plug has a bifurcated design.

17. A system, comprising:
a flow control comprising a pressure-balanced valve with a plug having openings that extend from a first side to a second side so as to allow fluid to vent from space on the first side to space on the second side;
an actuator having a housing and a diaphragm disposed inside of the housing and coupled with the pressure-balanced valve, the diaphragm creating two separate, airtight chambers in the housing, one on each side of the diaphragm;
a control system, the control system comprising a fixed differential pressure pilot valve and a variable differential pressure pilot valve, and an orifice and a check valve in flow connection with the variable differential pressure pilot valve; and
conduit coupling the variable differential pressure pilot valve to both chambers in the housing, the conduit including a first sense line coupling flow between a first side of the check valve on the variable differential pilot valve and a first side of the diaphragm in the actuator, a second sense line coupling flow of fluid between a location downstream of said pressure regulator and the first side of the diaphragm in the actuator, and a load line coupling flow of fluid between a second side of the check valve on the variable differential pilot valve and a second side of the diaphragm in the actuator.

18. The system of claim 17, wherein the orifice is a fixed orifice.

19. The system of claim 17, wherein the housing removeably mounts to the flow control.

20. The system of claim 17, wherein the control system removeably mounts to the housing.

* * * * *